US008139326B2

(12) United States Patent
Itou et al.

(10) Patent No.: US 8,139,326 B2

(45) Date of Patent: Mar. 20, 2012

(54) UNIT WITH BUILT-IN CONTROL CIRCUIT WITH PROTECT ELEMENTS

(75) Inventors: Kenn Itou, Susono (JP); Akiyoshi Kanazawa, Susono (JP)

(73) Assignee: Yazaki Corporation, Tokyo (JP)

(*) Notice: Subject to any disclaimer, the term of this patent is extended or adjusted under 35 U.S.C. 154(b) by 652 days.

(21) Appl. No.: 12/332,398

(22) Filed: Dec. 11, 2008

(65) Prior Publication Data

US 2009/0156030 A1 Jun. 18, 2009

(30) Foreign Application Priority Data

Dec. 11, 2007 (JP) ................................ P2007-319306

(51) Int. Cl.
*H02H 7/00* (2006.01)

(52) U.S. Cl. .............. 361/7; 361/42; 361/111; 361/760; 361/767

(58) Field of Classification Search .................. 174/250, 174/255, 260, 261, 527–529, 535, 536, 549; 361/760, 766, 767, 782, 783, 1–23, 42, 111, 361/56, 88, 91.1, 91.5, 91.6, 91.7, 92; 257/173, 257/355, 546

See application file for complete search history.

(56) References Cited

U.S. PATENT DOCUMENTS

| | | | | |
|---|---|---|---|---|
| 5,089,929 | A * | 2/1992 | Hilland | 361/111 |
| 5,119,266 | A * | 6/1992 | Petry | 361/111 |
| 6,185,105 | B1 * | 2/2001 | Inoguchi | 361/760 |
| 6,717,485 | B2 * | 4/2004 | Kolb et al. | 333/12 |
| 2002/0028527 | A1 * | 3/2002 | Maeda et al. | 438/29 |
| 2006/0055012 | A1 * | 3/2006 | Hsin Chen et al. | 257/678 |
| 2007/0177364 | A1 * | 8/2007 | Larsen et al. | 361/760 |

FOREIGN PATENT DOCUMENTS

JP 2005-276489 A 10/2005

* cited by examiner

*Primary Examiner* — Hoa C Nguyen

(74) *Attorney, Agent, or Firm* — Sughrue Mion, PLLC

(57) ABSTRACT

The present invention provides a unit with a built-in control circuit capable of cost reduction. The unit of the present invention is an unit with built-in control circuit comprising a ground line, a control circuit including a plurality of terminals to be connected to an IC-chip, and a plurality of protect elements connected to the terminal and the ground line.

11 Claims, 8 Drawing Sheets

UNIT WITH BUILT-IN CONTROL CIRCUIT WITH PROTECT ELEMENTS

BACKGROUND OF THE INVENTION

The present invention relates to a unit with built-in control circuit housing various types of circuit elements and used for connection of wires and the like.

A vehicle as a mobile object mounts a variety of electronic devices such as an air conditioner, a wiper and a power window. A communication system is used to transmit power or a control signal to the electronic devices. This type of communication system includes a connector with a built-in function as a unit with a built-in control circuit connected to each electronic device.

In the communication system, each connector with a built-in function transmits/receives signals to/from another connector with a built-in function via an external communication line and controls the operation of multiple electronic devices based on the signal transmission/reception. Thus, each connector with a built-in function includes a circuit element composed of a CPU for controlling each connector with a built-in function and the like.

The connector with a built-in function described in Patent Reference JP-A-2005-276489 modifies the circuit in the circuit element and arranges a protective element such as a capacitor or a diode in the circuit in order to prevent the circuit element from static electricity around the connector or from a counter electromotive force generated when the connector is attached/removed to/from an external electronic device. However, in case a protective element is arranged in the circuit element, it is necessary to modify the specifications for a built-in protective element in accordance with the situation in which the circuit element, that is, the connector with a built-in function is used. To respond to such changeover to the specifications, it is necessary to modify the circuit element itself which is likely to add to the cost of the connector with a built-in function.

An object of the invention is to provide a unit with a built-in control circuit capable of cost reduction.

BRIEF SUMMARY OF THE INVENTION

To solve the problems and attain the object, a unit with a built-in control circuit according to the invention as a first aspect of the invention includes a ground line, a control circuit including a plurality of terminals to be connected to an IC-chip and a plurality of protect elements connected to the terminal and the ground line. Preferably, the ground line has a conductive connection part connected to a ground. Preferably, each of the plurality of the protect elements is mounted on respective one of the plurality of the terminal.

A second aspect of the invention according to the first aspect of the invention is the unit with a built-in control circuit the unit has a conductive member through which the plurality of protect elements is connected to the plurality of the terminals and the ground line.

A third aspect of the invention according to the first aspect of the invention is the unit with a built-in control circuit on which the conductive member and the ground line are integrally provided. Preferably, the conductive member is formed integrally with the conductive connecting part.

According to the unit with a built-in control circuit according to the first aspect of the invention, a protective element is attached to both the terminals and the conductive connection part. Thus, changeovers to the specifications for the protective element are supported only by changing the protective elements attached to the terminals and the conductive connection part.

The unit with a built-in control circuit according to the second aspect of the invention includes a conductive member for connecting the conductive connecting part and the protective element thus reliably connecting the protective element and the conductive connecting part.

The unit with a built-in control circuit according to the third aspect of the invention includes a conductive member formed integrally with the conductive connecting part thus reducing the number of parts.

As described above, the invention according to the first aspect of the invention supports changeovers to the specifications for a protective element by changing the protective elements attached to the terminals and the conductive connection part. This eliminates the need for modifying a circuit element even when the specifications for the protective element are changed. This prevents an increase in the product number of circuit elements and prevents an increase in the cost of a unit with a built-in control circuit.

The invention according to the second aspect of the invention includes a conductive member for connecting the conductive connecting part and the protective elements thus reliably connecting the protective element and the conductive connecting part.

The invention according to the third aspect of the invention includes a conductive member formed integrally with the conductive connecting part thus reducing the number of parts. This more reliably prevents an increase in the cost of a unit with a built-in control circuit.

DETAIL DESCRIPTION OF PREFERRED EMBODIMENT

A connector with a built-in function (hereinafter simply referred to as a connector) as a unit with a built-in control circuit according to the first embodiment of the invention will be described referring to FIGS. 1 and 2.

A connector 1 includes a vehicle communication system mounted on an automobile. The connector 1 is attached to various types of electronic devices (equivalent to external devices) mounted on an automobile and electrically connects these electronic devices to transmit/receive a signal between the electronic devices.

Figure 1:
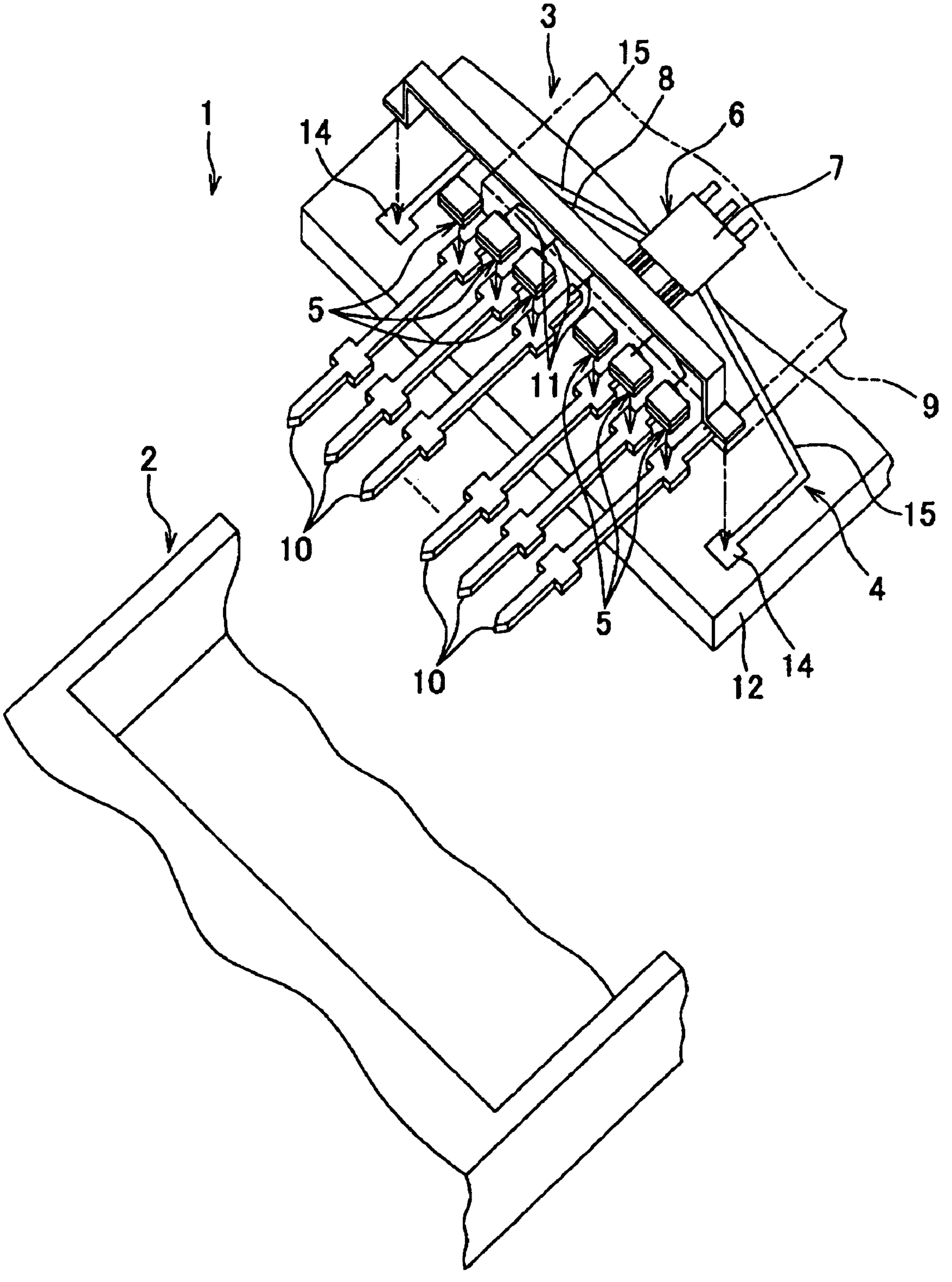
FIG. 1 is an exploded perspective view of a connector with a built-in function according to the first embodiment of the invention.

As shown in FIG. 1, the connector 1 includes an outer housing 2, a control circuit package 3 as a control circuit, a conductive connecting part 4, and capacitors 5 as a plurality of protective elements. The outer housing 2 is composed of an insulating resin and formed into a flat box.

Figure 2:
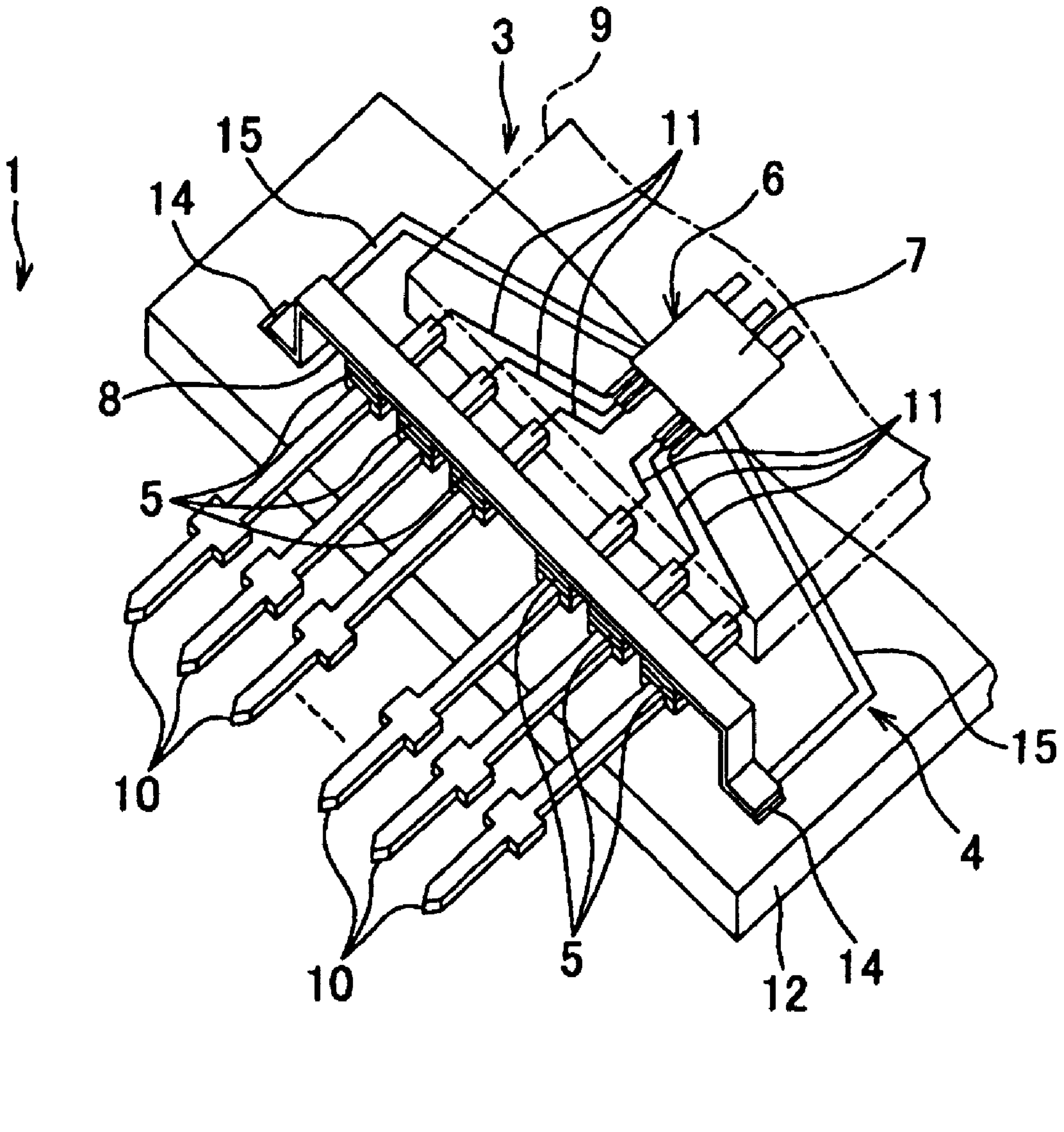
FIG. 2 is a perspective view of the control circuit package of the connector with a built-in function and the like shown in FIG. 1.

As shown in FIGS. 1 and 2, the control circuit package 3 includes a lead frame 6, an IC chip 7 as a circuit element, a conductive member 8, and a resin sealant 9. The lead frame 6 is composed of a conductive metal. The lead frame 6 integrally includes a chip holding part (not shown), a plurality of male tabs (corresponding to terminals) 10, a plurality of wire connecting parts not shown, and a plurality of coupling parts 11.

The chip holding part is formed in a flat plate. The chip holing part bonds and positions thereon an IC chip 7 with epoxy, Ag paste, solder or the like.

The male tab 10 is formed into a bar in a straight line. The male tabs 10 are arranged spaced from and parallel to each other. When the control circuit package 3 is housed in the outer housing 2, a male tab 10 is connected to the terminal bracket of an electronic device to which the connector 1 is fitted. The wire connecting parts are arranged in parallel while spaced from each other. The plurality of male tabs 10 and the plurality of wire connecting parts position a chip holding part therebetween.

Each of the coupling parts 11 is formed into a rod shape bent so as to be directed from the male tabs 10 and the wire connecting parts to the chip holding part. Some of the coupling parts 11 connect the chip holding part and the male tabs 10 while others connect the chip holding part and the wire connecting parts.

The IC chip 7 is arranged on the chip holding part and attached to the lead frame 6. The IC chip 7 is connected to the coupling parts 11 via well-known bonding wires. The IC chip 7 electrically connects the male tabs 10 and the wire connecting parts via the coupling parts 11 in accordance with a predetermined pattern. In this way, the IC chip 7 is mounted on the lead frame 6.

The conductive member 8 is composed of a conductive metal and formed into a strip. The conductive member 8 is attached to the ground plane 14 (described later) of the conductive connecting part 4 with both ends of the conductive member 8 in the longitudinal direction overlaid on the ground plane 14. The conductive member 8 has the central part thereof excluding its ends overlaid on a plurality of capacitors 5. A plurality of capacitors 5 are attached to the central part.

The resin sealant 9 is composed of a synthetic resin and formed in a flat box. The resin sealant 9 is molded so as to house in a mold, at least, a chip holding part and an IC chip 7 on the chip holing part, a base part of each male tab 10 near the chip holding part, and a coupling part 11 coupling the chip holding part and the male tab 10, thereby sealing these. In other words, the resin sealant 9 covers and houses the IC chip and the central part of the lead frame 6. The resin sealant 9 seals the IC chip 7 and the lead frame 6 while the wire connecting part and the part of the male tab 10 excluding the base part are exposed from the resin mold.

The conductive connecting part 4 is fabricated for example by punching a conductive sheet metal. The conductive connecting part 4 integrally includes two ground planes 14 and coupling sides 15 connected to the ground planes 14. The ground planes 14 are arranged while spaced from each other. The coupling sides 15 (two in the illustrated example) extend in straight lines parallel to each other from the ground planes 14 and then extend in straight lines in a direction approaching each other. The ground plane 14, that is, the conductive connecting part 4, is electrically connected to a ground (not shown). Therefore, the conductive connecting part 4 including the ground planes 14 and the coupling sides 15 forms a ground line.

The conductive connecting part 4 is housed in the outer housing 2 while supported by a substrate 12 formed of an insulating resin. The substrate 12, that is, the conductive connecting part 4 is formed in a size that may be housed in the outer housing 2.

The capacitors 5 are arranged in the same number as the male tabs 10 in the illustrated example. Each capacitor 5 has one end attached to the male tab 10 and the other end attached to the conductive member 8. The capacitor 5 electrically connects each male tab 10 and the conductive connecting part 4 to each other. When the electric charge of the power supplied via the male tab 10 reaches a predetermined electric charge, the capacitor 5 supplies the power supplied via the male tab 10 to the conductive connecting part 4 via the conductive member 8 without supplying the same to the IC chip 7. The capacitor 5 thus prevents the power exceeding a predetermined electric charge from being applied to the IC chip 7 thereby protecting the IC chip 7 from static electricity or a counter electromotive force. The predetermined electric charge refers to an electric charge that will not give serious damage to the IC chip 7. While the electric charge of the power supplied via the male tab 10 is lower than a predetermined electric charge, the capacitor 5 supplies the power supplied via the male tab 10 to the IC chip 7.

The connector 1 of the above configuration is assembled in the following way. First, the capacitor 5 is attached to each male tab 10 of the control circuit package 3, a predetermined wire is attached to the wire connecting part, and the control circuit package 3 is overlaid on the conductive connecting part 4. The central part of the conductive member 8 is overlaid on a plurality of capacitors 5 and both ends of the conductive member 8 are overlaid on the ground plane 14 and these components are fixed together. The control circuit package 3 and the conductive connecting part 4 fixed together are housed in the outer housing 2.

The connector 1 of the above configuration is assembled in the above procedure. The assembled connector 1 is fitted to each electronic device and is attached thereto. The male tab 10 electrically connects the electronic device and the IC chip 7 to each other. The connector 1 connects electronic devices to each other and performs communications between these electronic devices.

According to this embodiment, a capacitor 5 is attached to both the male tab 10 and the conductive connecting part 4. Thus, changeovers to the specifications for a capacitor 5 are supported only by changing the capacitor 5 attached to the male tab 10 and the conductive connecting part 4. Therefore, it is not necessary to change the IC chip 7 even when the specifications for the capacitor 5 are changed. This prevents an increase in the product number of IC chips 7 and prevents an increase in the cost of the connector 1.

As the unit of the present embodiment is provided a conductive member 8 for connecting the conductive connecting part 4 and the capacitor 5, the capacitor 5 is connected to the conductive connecting part 4 certainly.

In the above embodiment, the conductive connecting part 4 includes the ground planes 14 and the coupling sides 15 and exposes these from the same surface of the substrate 12.

Figure 3:
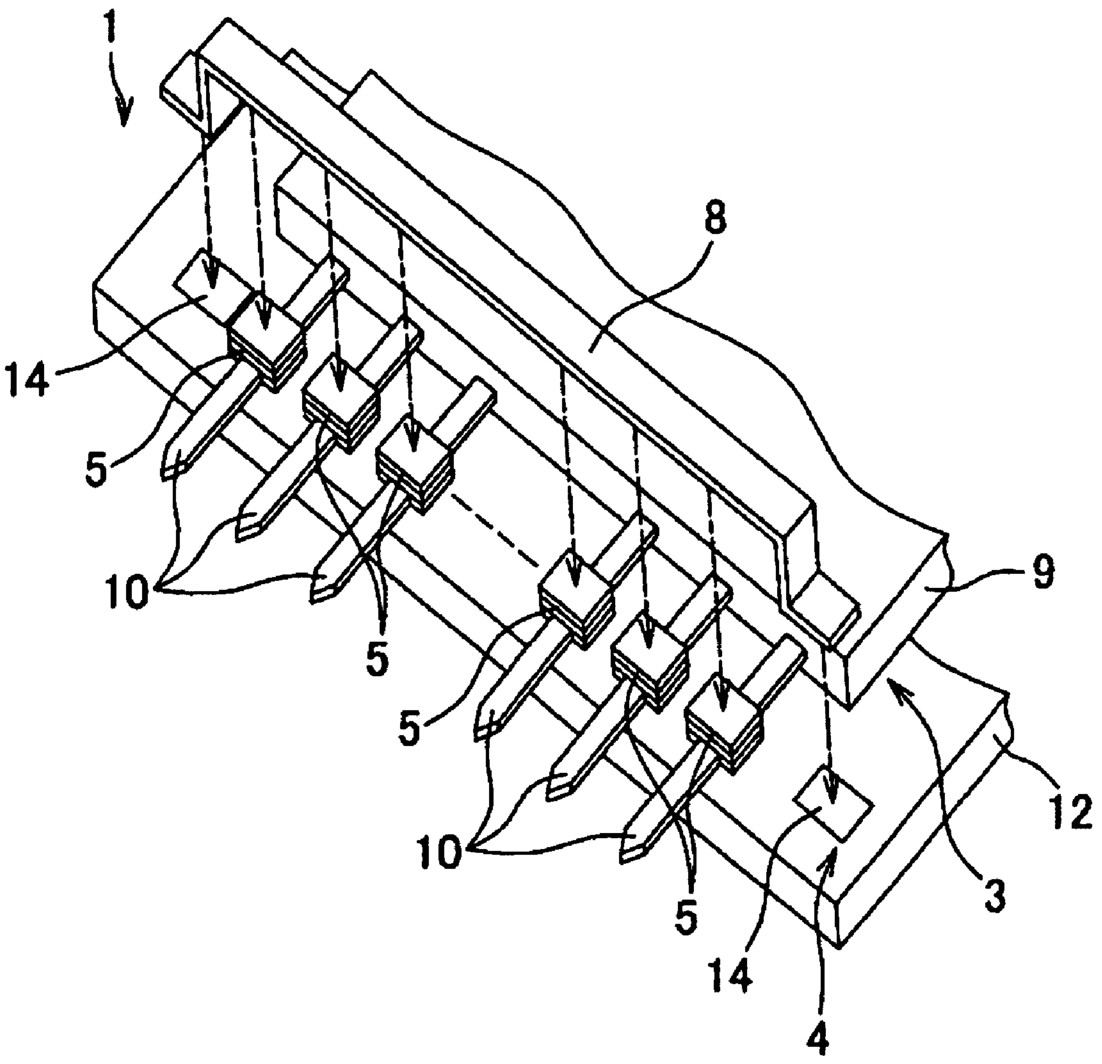
FIG. 3 is an exploded perspective view of an exemplary variation of the control circuit package of the connector with a built-in function and the like shown in FIG. 1.
Figure 4:
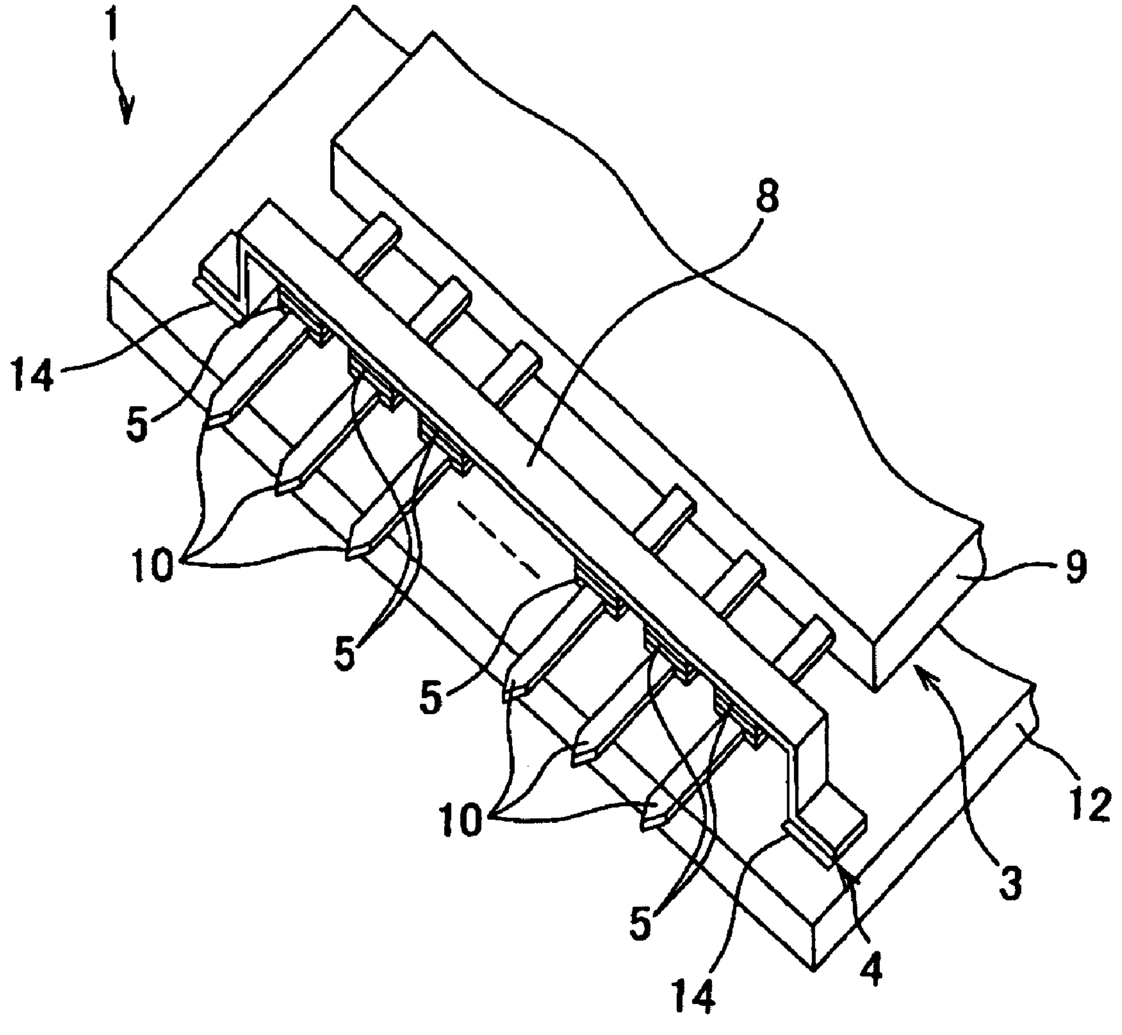
FIG. 4 is a perspective view of the control circuit package and the like shown in FIG. 3.

However, in this invention, as shown in FIGS. 3 and 4, the conductive connecting part 4 may expose the ground planes 14 and the coupling sides 15 on different surfaces of the substrate 12. In FIGS. 3 and 4, the same portion as that in the above embodiment is assigned the same sign and corresponding description is omitted.

Figure 5:
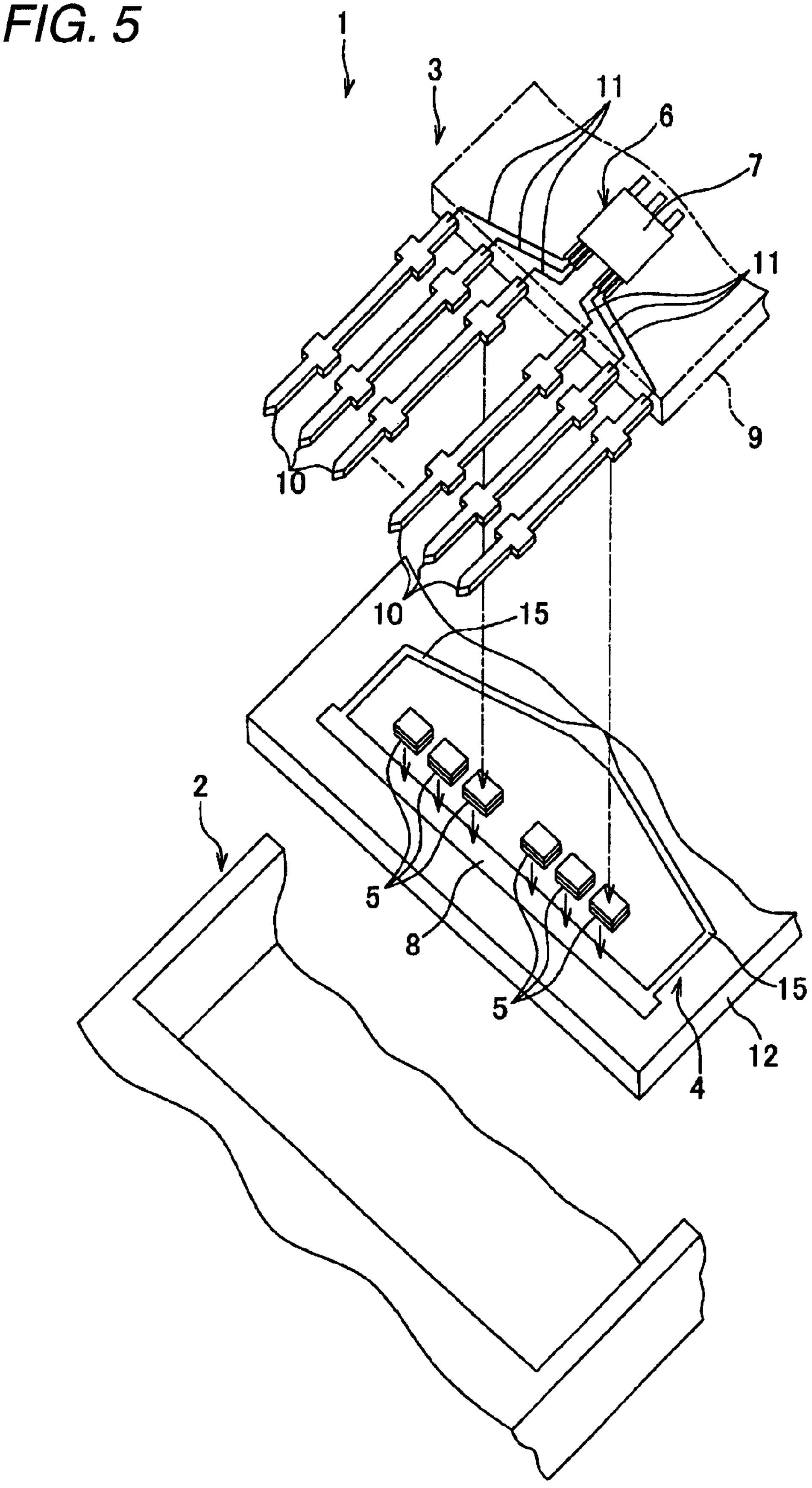
FIG. 5 is an exploded perspective view of a connector with a built-in function according to the second embodiment of the invention.
Figure 6:
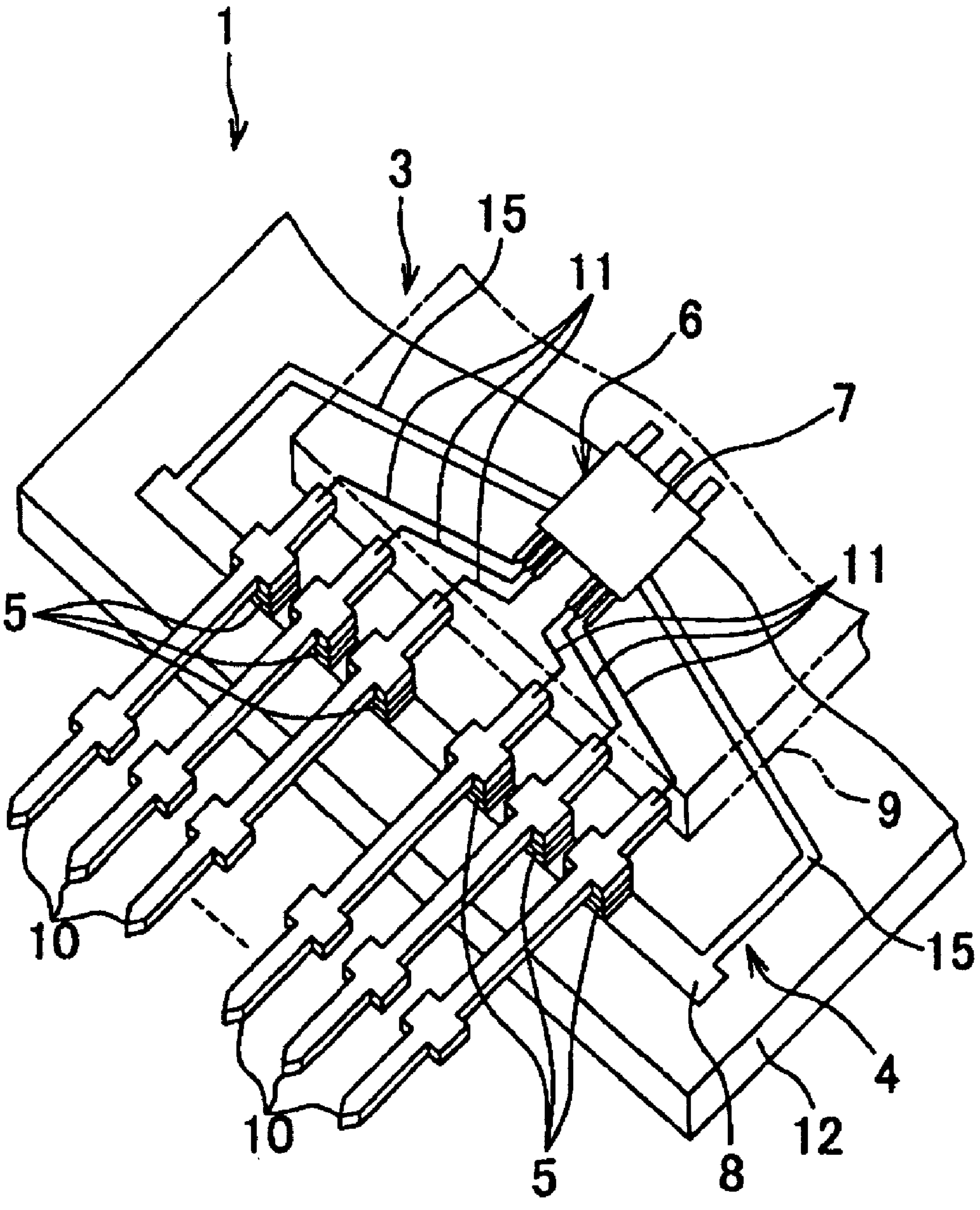
FIG. 6 is a perspective view of the control circuit package of the connector with a built-in function and the like shown in FIG. 5.

A connector 1 according to the second embodiment of the invention is described referring to FIGS. 5 and 6. The same portion as that in the above embodiment is assigned the same sign and corresponding description is omitted.

In this embodiment, a conductive member 8 is integrally arranged with a coupling side 15, that is, a conductive connecting part 4. The conductive member 8 is formed integrally with a coupling side 15, that is, the conductive connecting part 4, and forms virtually part of the conductive connecting part 4. In the illustrated example, the conductive connecting part 4 and the conductive member 8 are obtained for example by punching the same sheet metal. The conductive connecting part 4 and the conductive member 8 are supported by the same substrate 12. In this embodiment, capacitors 5 are directly overlaid on and attached to the conductive member 8 without a ground plane 14 being arranged.

According to this embodiment, in addition to the first embodiment, the conductive member 8 is formed integrally with the conductive connecting part 4 thus reducing the number of parts. This more reliably prevents an increase in the cost of the connector 1.

Figure 7:
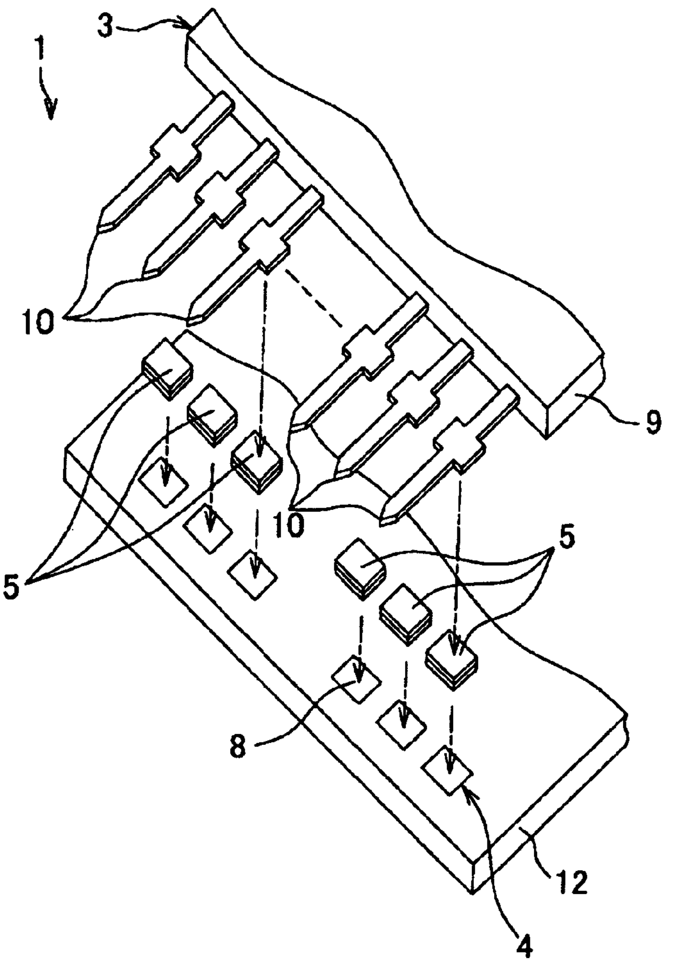
FIG. 7 is an exploded perspective view of an exemplary variation of the control circuit package of the connector with a built-in function and the like shown in FIG. 5.
Figure 8:
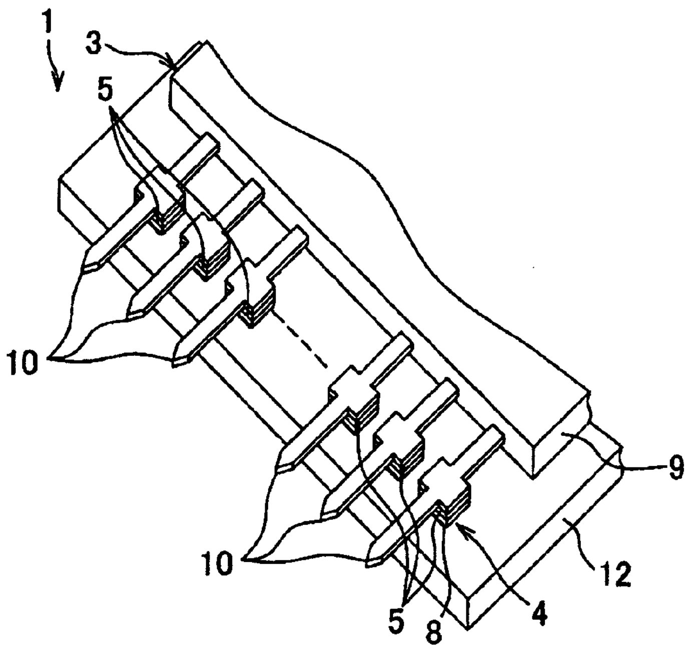
FIG. 8 is a perspective view of the control circuit package and the like shown in FIG. 7.

The conductive member 8 and the coupling sides 15 are exposed from the same surface of the substrate 12 in this embodiment. However, in this invention, as shown in FIGS. 7 and 8, a portion of the conductive member 8 to which a capacitor 5 is attached and the remaining portion may be exposed respectively from different surfaces of the substrate 12. In FIGS. 7 and 8, the same portion as that in the above embodiment is assigned the same sign and corresponding description is omitted.

Figure 9:
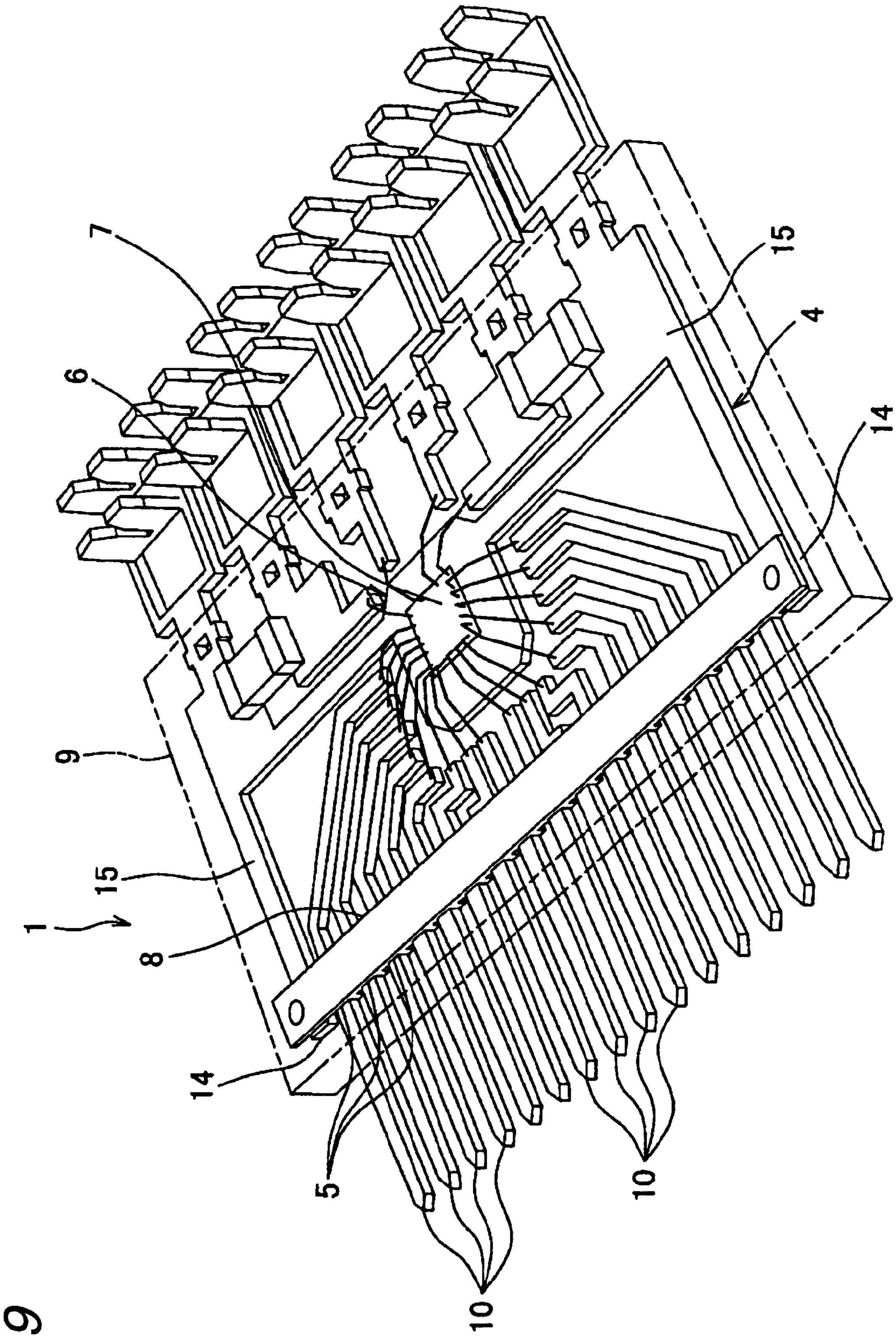
FIG. 9 is a perspective view of an exemplary variation of the control circuit package according to the invention.

In the invention, as shown in FIG. 9, it is possible to integrally mold, by using a resin sealant 9, the entirety of a lead frame 6, IC chips 7, conductive members 8, a conductive connecting part 4 and capacitors 5, the entirety excluding the tip (a portion closer to the end than a portion to which the capacitor 5 is attached) of the male tab 10 of the lead frame 6 in the control circuit package 3 and the wire connecting part, without arranging a substrate 12. In FIG. 9, the same portion as that in the above embodiment is assigned the same sign and corresponding description is omitted. This embodiment also has the same advantages as those of the above embodiment.

While a capacitor 5 is used as a protective element in the above embodiment, the invention is not limited to a capacitor 5 but another electric component such as a diode may be used as a protective element.

The foregoing embodiments show only representative aspects of the invention. The invention is by no means limited to the embodiments described herein. Various changes and modifications can be made in the invention without departing from the spirit and scope thereof.

What is claimed is:

1. A unit with built-in control circuit comprising:

a ground line;

a control circuit including a plurality of terminals; and a plurality of protect elements connected to the terminals and the ground line; and a conductive member that connects each of the protect elements to the terminals and to the ground line, wherein the conductive member is formed as an elongated strip including a central part on which the protect elements are mounted and edge parts formed on opposing ends thereof to which the ground line is connected.

2. The unit according to claim 1, wherein the terminals are connected to an IC-chip.

3. The unit according to claim 2, wherein the IC-chip and a part of the terminals are molded by a resin.

4. The unit according to claim 1, wherein each of the plurality of the protect elements is mounted on a respective one of the plurality of the terminals.

5. The unit according to claim 4, wherein the ground line and the conductive member are formed on a same surface.

6. The unit according to claim 1, wherein the conductive member and the ground line are integrally provided.

7. The unit according to claim 1, wherein, at least one of the protect elements is a condenser.

8. The unit according to claim 1, wherein at least one of the protect element is a diode.

9. The unit according to claim 1, wherein the ground line includes a ground plane provided at each of the edge parts respectively, and a coupling side connected to each of the ground planes, and wherein the coupling sides extend in straight lines parallel to each other from the ground planes and then extend in straight lines in a direction approaching each other.

10. The unit according to claim 1, wherein the plurality of male terminals are spaced from and parallel to each other, including a male tab and a coupling part, wherein the coupling part extends from the conductive member to a chip holding part.

11. The unit according to claim 10, wherein each protect element has one end attached to the male tab and an other end attached to the conductive member.

* * * * *